(12) United States Patent
Albero et al.

(10) Patent No.: US 12,413,665 B2
(45) Date of Patent: Sep. 9, 2025

(54) AUTOMATED VISHING DETECTION TO PREVENT DEEPFAKE AND CHATBOT ATTACKS

(71) Applicant: Bank of America Corporation, Charlotte, NC (US)

(72) Inventors: George Albero, Charlotte, NC (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 141 days.

(21) Appl. No.: 18/232,430

(22) Filed: Aug. 10, 2023

(65) Prior Publication Data

US 2025/0055937 A1 Feb. 13, 2025

(51) Int. Cl.
*H04M 3/00* (2024.01)
*H04M 3/22* (2006.01)

(52) U.S. Cl.
CPC .. *H04M 3/2281* (2013.01); *H04M 2203/6027* (2013.01); *H04M 2203/6072* (2013.01)

(58) Field of Classification Search
USPC ................ 379/188, 200, 265.01–265.14
See application file for complete search history.

(56) References Cited

U.S. PATENT DOCUMENTS

| | | | |
|---|---|---|---|
| 10,237,302 B1 | 3/2019 | Kras et al. | |
| 10,701,106 B2 | 6/2020 | Kras et al. | |
| 10,970,394 B2 | 4/2021 | Kedem et al. | |
| 11,423,926 B2 | 8/2022 | Enzinger et al. | |
| 11,457,041 B2 | 9/2022 | Kras et al. | |
| 12,093,374 B1* | 9/2024 | Schindel | G06F 21/552 |
| 2016/0259931 A1* | 9/2016 | Dave | H04L 63/105 |
| 2019/0156034 A1 | 5/2019 | Kedem et al. | |
| 2019/0158535 A1 | 5/2019 | Kedem et al. | |
| 2019/0245877 A1* | 8/2019 | Toth | H04L 63/1425 |
| 2019/0297110 A1 | 9/2019 | Kras et al. | |
| 2020/0211075 A1* | 7/2020 | Kumar | G06F 3/0346 |
| 2020/0296133 A1 | 9/2020 | Kras et al. | |
| 2021/0233204 A1 | 7/2021 | Alattar et al. | |
| 2021/0319090 A1 | 10/2021 | Demir et al. | |
| 2021/0319240 A1 | 10/2021 | Demir et al. | |
| 2021/0329030 A1 | 10/2021 | Kedem et al. | |
| 2021/0406568 A1 | 12/2021 | Liberman et al. | |
| 2022/0004904 A1 | 1/2022 | Stemmer et al. | |

(Continued)

*Primary Examiner* — William J Deane, Jr.
(74) *Attorney, Agent, or Firm* — Banner & Witcoff, Ltd.

(57) ABSTRACT

A computing platform may train, using historical call information, a prompt generation model to identify, for an initiated call between a first individual and a second individual, one or more security prompts to validate an identity of the first individual. The computing platform may detect and temporarily pause a call. The computing platform may input, into the prompt generation model, information of the call, which may cause the prompt generation model to output the security prompts, which may be customized CAPTCHA tests based on the information. The computing platform may send, while the call is paused and to a user device of the first individual, the security prompts. The computing platform may receive, while the call is paused and from the user device, responses to the one or more security prompts. The computing platform may validate, while the call is paused, the responses, and resume the call.

20 Claims, 9 Drawing Sheets

(56) References Cited

U.S. PATENT DOCUMENTS

| | | |
|---|---|---|
| 2022/0121868 A1 | 4/2022 | Chen et al. |
| 2022/0129664 A1 | 4/2022 | Li et al. |
| 2022/0130274 A1* | 4/2022 | Krishna Raju ..... H04L 63/1433 |
| 2022/0269922 A1 | 8/2022 | Mathews |
| 2022/0353082 A1 | 11/2022 | Busch |
| 2022/0414679 A1* | 12/2022 | Kumar ............... G06Q 10/0635 |
| 2023/0179823 A1 | 6/2023 | Marten et al. |

* cited by examiner

405 — Please select all images that match your dynamic security key for this call

| 1 | 1 | 0 | 2 |
|---|---|---|---|
| 3 | 5 | 7 | 0 |
| 8 | 2 | 3 | 3 |
| 4 | 2 | 9 | 7 |

FIG. 4

505 — Call Verification Interface

Your call is being verified for security purposes. We will notify you once approved. Thank you for your patience!

Call Approval Notification

Your call has been validated. Thank you for your patience!

Security Notification

This call has been flagged as a potential security risk. Please select "9" to end the call and submit the call details for further investigation.

FIG. 7

AUTOMATED VISHING DETECTION TO PREVENT DEEPFAKE AND CHATBOT ATTACKS

BACKGROUND

In some instances, enterprise organizations may provide service to their customers and/or clients, such as financial institutions, merchants, service providers, and/or other enterprises. In some instances, these service may be provided through voice communication between individuals (e.g., customer service calls, or the like). In some instances, such communication may include confidential information, personal identifiable information, and/or other information that may be private to an individual on the call (e.g., a client, or the like). As lifelike chatbots, deepfakes, and/or other voice simulators become more prevalent and accurate, they may augment the problem of automated vishing. For example, such impersonation/simulation may result in the unintended sharing of private and/or other confidential information with unauthorized parties. Accordingly, it may be important to provide enhanced security mechanisms to detect and/or otherwise prevent vishing attacks.

SUMMARY

Aspects of the disclosure provide effective, efficient, scalable, and convenient technical solutions that address and overcome the technical problems associated with deepfake, chatbot, and/or other impersonation detection. In one or more instances, a computing platform having at least one processor, a communication interface, and memory may train, using historical call information, a prompt generation model, which may configure the prompt generation model to identify, for an initiated call between a first individual and a second individual, one or more security prompts to validate an identity of the first individual. The computing platform may detect a call between the first individual and the second individual, where the call may have been initiated by the first individual. The computing platform may temporarily pause the call. The computing platform may input, into the prompt generation model and while the call is paused, information of one or more of: the call, the first individual, or the second individual, which may cause the prompt generation model to output the one or more security prompts, where the one or more security prompts may include customized Completed Automated Public Turing ("CAPTCHA") tests based on the information. The computing platform may send, while the call is paused and to a user device of the first individual, the one or more security prompts and one or more commands directing the user device to display the one or more security prompts, which may cause the user device to display the one or more security prompts. The computing platform may receive, while the call is paused and from the user device, security input information comprising responses to the one or more security prompts. The computing platform may validate, while the call is paused, the security input information. Based on successful validation of the security input information, the computing platform may cause the call to resume.

In one or more instances, the historical call information may be one or more of: call topic information, caller information, recipient information, or geolocation information. In one or more instances, the one or more security prompts may include one or more personalized questions for the first individual.

In one or more examples, the customized CAPTCHA tests may prompt the first individual to select one or more images, from a plurality of images, where the one or more images may include information specific to one or more of: the first individual, the second individual, or a combination of the first individual and the second individual. In one or more instances, an indication of a type of information to be selected from the one or more images may be sent to the first individual using a different channel than is used to send the one or more images, and at a different time than the one or more images are sent.

In one or more instances, the customized CAPTCHA tests might not indicate which of the plurality of images should be selected. In one or more instances, the customized CAPTCHA tests may prompt the first individual to select one or more images that include numeric information corresponding to a profile of the first individual, a profile of the second individual, and a historical interaction between the first individual and the second individual.

In one or more examples, validating the security input information may include comparing a number of correct responses to the one or more security prompts to a security threshold, which may be selected based on the information of the second individual and the information of the call. In one or more examples, based on failing to successfully validate the security input information, the computing platform may: 1) identify that the first individual corresponds to one of: a deepfake, a chatbot, or an impersonator, 2) terminate the call, and 3) initiate one or more security actions.

In one or more instances, the computing platform may update, using a dynamic feedback loop and based on the one or more security prompts, the security input information, the information of the first individual, the information of the second individual, and the information of the call, the prompt generation model. In one or more instances, updating the prompt generation model may cause the prompt generation model to perform one or more of: adding new security prompts or removing the one or more security prompts based on receiving consensus information from a plurality of individuals indicating that the one or more security prompts resulted in one of: a false positive validation or a false negative validation. In one or more instances, pausing the call may be based on detecting, using natural language processing and by an application running on a user device of the second user, that the call corresponds to a conversation regarding confidential information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4-7 depict illustrative user interfaces for preventing deepfake and chatbot attacks using automated vishing detection in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for preventing spoofing, tampering, denial of service and/or other attacks using autogenerated vishing mitigation are described herein. For example, as lifelike chatbots and deepfake voice simulators become more accurate, the problem of automated vishing may become more and more prevalent. A customer may be fooled into sharing private and/or confidential information through vishing.

For example, as soon as a caller identifies themselves as an employee of an enterprise organization tied to an automated vishing mechanism (e.g., an agent, employee, or the like), the automated vishing prevention may go into effect. This may alert the customer that a vishing test is being run, and may mute the customer. The system may then ask the agent a few questions about the customer whose answers only a live agent/employee may know or have access to. If the caller fails to answer the question or obfuscates, the call may be immediately blocked.

The autogenerated vishing system may be programmed to generate predetermined false answers in case the vishers have a credit report, account information, or the like. For example, the autogenerated vishing system may prompt the caller with "which of the following accounts am I associated with?" Where some (or all) of the listed accounts are fake. In some instances, the customer may provide an input (e.g., press nine on a keypad, or the like), which may trigger a predetermined false account response. The automated response actions may include sending a recording, a number called, a number dialed from, and/or other information to an authority. The automated response actions may further include sending automated fraud alerts on accounts, multi-factor authentication prompts, and/or other information.

Figure 1A:
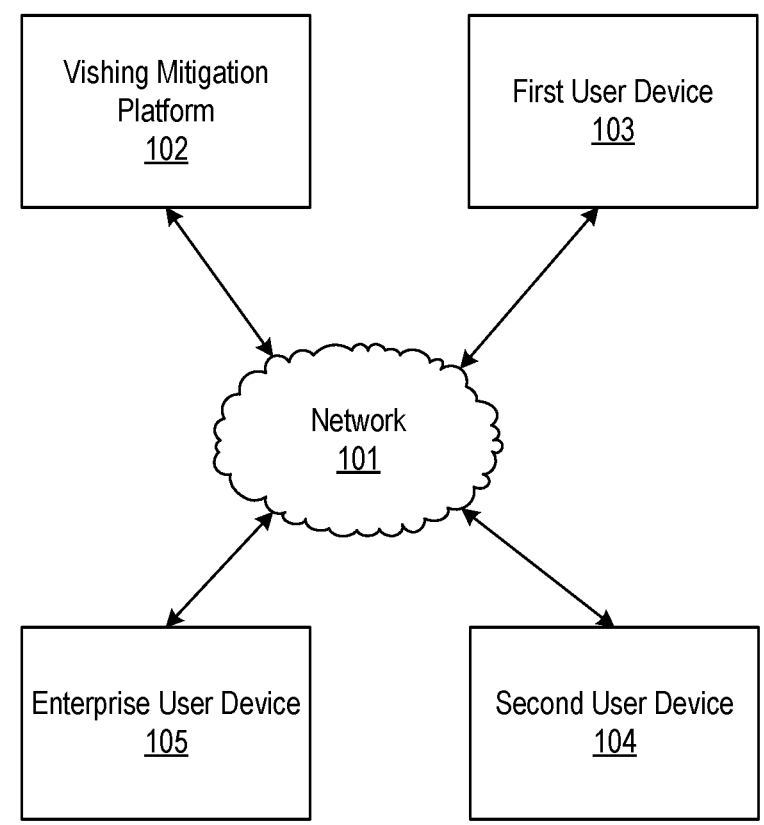
FIGS. 1A-1B depict an illustrative computing environment for preventing deepfake and chatbot attacks using automated vishing detection in accordance with one or more example embodiments.
Figure 1B:
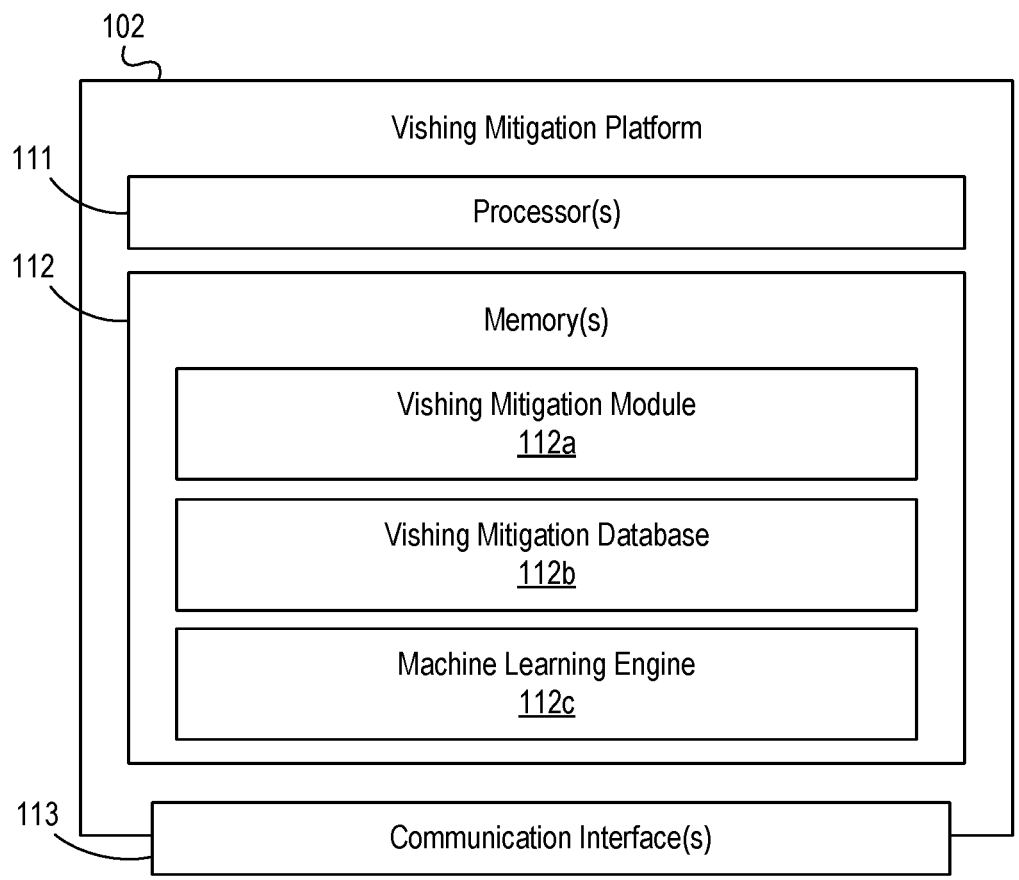

FIGS. 1A-1B depict an illustrative computing environment for preventing deepfake and chatbot attacks using automated vishing detection in accordance with one or more example embodiments. Referring to FIG. 1A, computing environment 100 may include one or more computer systems. For example, computing environment 100 may include vishing mitigation platform 102, first user device 103, second user device 104, and enterprise user device 105.

As described further below, vishing mitigation platform 102 may be a computer system that includes one or more computing devices (e.g., servers, server blades, or the like) and/or other computer components (e.g., processors, memories, communication interfaces) that may be used to provide automated vishing mitigation services. For example, vishing mitigation platform 102 may be configured to train, host, and/or otherwise maintain a model (e.g., a machine learning model, or the like), which may be configured to generate customized security prompts to validate an identity of a caller.

Although vishing mitigation platform 102 is shown as a distinct system, this is for illustrative purposes only. In some instances, the services provided by the vishing mitigation platform 102 may be accessed, supported, and/or otherwise provided by an application hosted at a user device (e.g., first user device 103).

First user device 103 may be and/or otherwise include a laptop computer, desktop computer, mobile device, tablet, smartphone, and/or other device that may be used by an individual (such as a client/customer of an enterprise organization). In some instances, the first user device 103 may be configured with an application (e.g., corresponding to the enterprise organization, or another enterprise organization), which may be configured to initiate an automated vishing mitigation service upon detecting particular speech using natural language processing. In some instances, first user device 103 may be configured to display one or more user interfaces (e.g., identity validation interfaces, security notifications, or the like).

Second user device 104 may be and/or otherwise include a laptop computer, desktop computer, mobile device, tablet, smartphone, and/or other device that may be used by an individual (who, for illustrative purposes, may be using a chatbot, deepfake, and/or otherwise simulating/impersonating a legitimate employee of an enterprise organization). In some instances, second user device 104 may be configured to display one or more user interfaces (e.g., identify verification interfaces, or the like).

Enterprise user device 105 may be and/or otherwise include a laptop computer, desktop computer, mobile device, tablet, smartphone, and/or other device that may be used by an individual (such as a legitimate employee of an enterprise organization). In some instances, enterprise user device 105 may be configured to display one or more user interfaces (e.g., security notifications, identify validation notifications, or the like).

Although a single vishing mitigation platform 102, enterprise user device 105, and two user devices (first user device 103 and second user device 104) are shown, any number of such devices may be deployed in the systems/methods described below without departing from the scope of the disclosure.

Computing environment 100 also may include one or more networks, which may interconnect vishing mitigation platform 102, first user device 103, second user device 104, enterprise user device 105, or the like. For example, computing environment 100 may include a network 101 (which may interconnect, e.g., vishing mitigation platform 102, first user device 103, second user device 104, enterprise user device 105, or the like).

In one or more arrangements, vishing mitigation platform 102, first user device 103, second user device 104, and enterprise user device 105 may be any type of computing device capable of sending and/or receiving requests and processing the requests accordingly. For example, vishing mitigation platform 102, first user device 103, second user device 104, enterprise user device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of vishing mitigation platform 102, first user device 103, second user device 104, and enterprise user device 105 may, in some instances, be special-purpose computing devices configured to perform specific functions.

Referring to FIG. 1B, vishing mitigation platform 102 may include one or more processors 111, memory 112, and communication interface 113. A data bus may interconnect processor 111, memory 112, and communication interface 113. Communication interface 113 may be a network interface configured to support communication between vishing mitigation platform 102 and one or more networks (e.g., network 101, or the like). Memory 112 may include one or more program modules having instructions that when executed by processor 111 cause vishing mitigation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of vishing mitigation platform 102 and/or by different computing devices that may form and/or otherwise make up vishing mitigation platform 102. For example, memory 112 may have, host, store, and/or include vishing mitigation module 112a, vishing mitigation database 112b, and/or machine learning engine 112c.

Vishing mitigation module 112a may have instructions that direct and/or cause vishing mitigation platform 102 to provide improved vishing mitigation techniques, as discussed in greater detail below. Vishing mitigation database 112b may store information used by vishing mitigation module 112a and/or vishing mitigation platform 102 in application of advanced techniques to provide improved vishing detection and mitigation services, and/or in performing other functions. Machine learning engine 112c may train, host, and/or otherwise refine a model that may be used to perform security prompt generation for automated vishing detection and mitigation, and/or other functions.

Figure 2A:
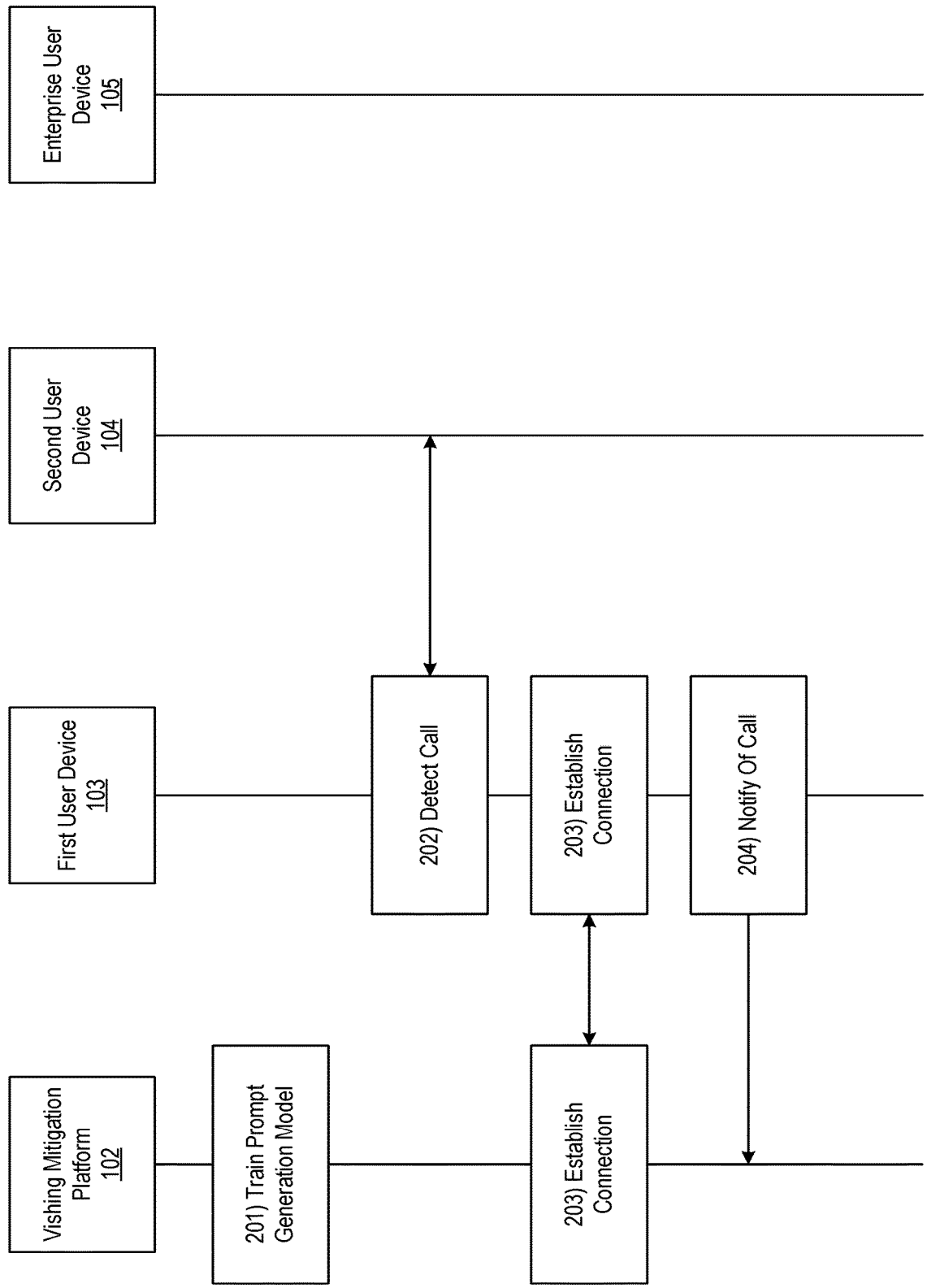
FIGS. 2A-2D depict an illustrative event sequence for preventing deepfake and chatbot attacks using automated vishing detection in accordance with one or more example embodiments.

FIGS. 2A-2D depict an illustrative event sequence for preventing deepfake and chatbot attacks using automated vishing detection in accordance with one or more example embodiments. Referring to FIG. 2A, at step 201, the vishing mitigation platform 102 may train a machine learning model (e.g., a prompt generation model). For example, the vishing mitigation platform 102 may train the prompt generation model to identify security prompt information for a particular individual (e.g., a caller, who may e.g., be a legitimate employee of an enterprise organization, or may be using deepfakes, chatbots, and/or other methods to impersonate a legitimate employee) when engaging in a call with another individual (e.g., a call recipient, who may e.g., be a client of the enterprise organization). For example, the vishing mitigation platform 102 may receive historical call information (e.g., details of topics discussed during previous calls with individuals), employee information (e.g., line of business, role, start date, previously performed actions, geolocation, and/or other information), client information (e.g., account information, previously requested actions, registration date, geolocation, and/or other information), previously generated security prompts (e.g., validating an identity of the caller), success/error information corresponding to the prompts, and/or other information. The vishing mitigation platform 102 may input the historical information into the prompt generation model to train the prompt generation model to establish stored correlations between the prompts and various scenarios (e.g., calls between a first individual and a second individual about a particular topic, or the like). In doing so, the vishing mitigation platform 102 may train the prompt generation model to identify, based on a call, prompts that may be generated to validate a caller identity (which may, e.g., prevent vishing attacks).

In some instances, in training the prompt generation model, the vishing mitigation platform 102 may train the vishing mitigation platform 102 to identify a confidence score for given security prompts (e.g., indicating a confidence that the security prompt will not result in a false positive and/or false negative validation result). In some instances, the prompt generation model may be trained to compare these confidence scores to one or more thresholds, and select the corresponding prompts if their corresponding confidence scores meet or exceed the given thresholds. In some instances, the prompt generation model may be trained to select one or more prompts, based on a given call and its corresponding participants.

In some instances, the vishing mitigation platform 102 may further train the prompt generation model to identify, based on responses to the security prompts (e.g., security input information) and a corresponding scenario, whether or not to validate a particular caller. In some instances, the prompt generation model may be trained to validate a particular caller only where all security prompts are successfully completed. In other instances, the prompt generation model may be trained to validate a particular caller where only a portion of the security prompts (e.g., at least a threshold number of security prompts) are successfully completed. In some instances, the prompt generation model may be trained to make this identification based on a given scenario (e.g., a topic of the call, the involved parties, or the like).

In some instances, in training the prompt generation model, the vishing mitigation platform 102 may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

At step 202, the first user device 103 may detect a call between the first user device 103 and the second user device 104. For example, the first user device 103 may be configured with an application that may use natural language processing to trigger analysis by the vishing mitigation platform 102. For example, the application may be executed to identify particular words or language corresponding to an enterprise associated with the application (e.g., a particular service, or the like), and to trigger the vishing mitigation accordingly. In some instances, the application may detect an audio signal at the first user device 103 itself and/or another device (e.g., hard-wired phone, computer, or the like).

In some instances, once detected, the first user device 103 may pause the call. For example. The first user device 103 may receive (e.g., from the vishing mitigation platform 102) and display a graphical user interface similar to graphical user interface 505, which is shown in FIG. 5.

At step 203, the first user device 103 may establish a connection with the vishing mitigation platform 102. For example, the first user device 103 may establish a first wireless data connection with the vishing mitigation platform 102 to link the first user device 103 to the vishing mitigation platform 102 (e.g., in preparation for notifying the vishing mitigation platform 102 of the detected call). In some instances, the vishing mitigation platform 102 may identify whether or not a connection is already established with the vishing mitigation platform 102. If a connection is already established with the vishing mitigation platform 102, the first user device 103 might not re-establish the connection. If a connection is not yet established with the vishing mitigation platform 102, the first user device 103 may identify the first wireless data connection as described herein.

At step 204, the first user device 103 may notify the vishing mitigation platform 102 of the detected call. For example, the first user device 103 may send a notification and/or other trigger signal to the vishing mitigation platform 102. In some instances, the first user device 103 may notify the vishing mitigation platform 102 of the call while the first wireless data connection is established.

Figure 2B:
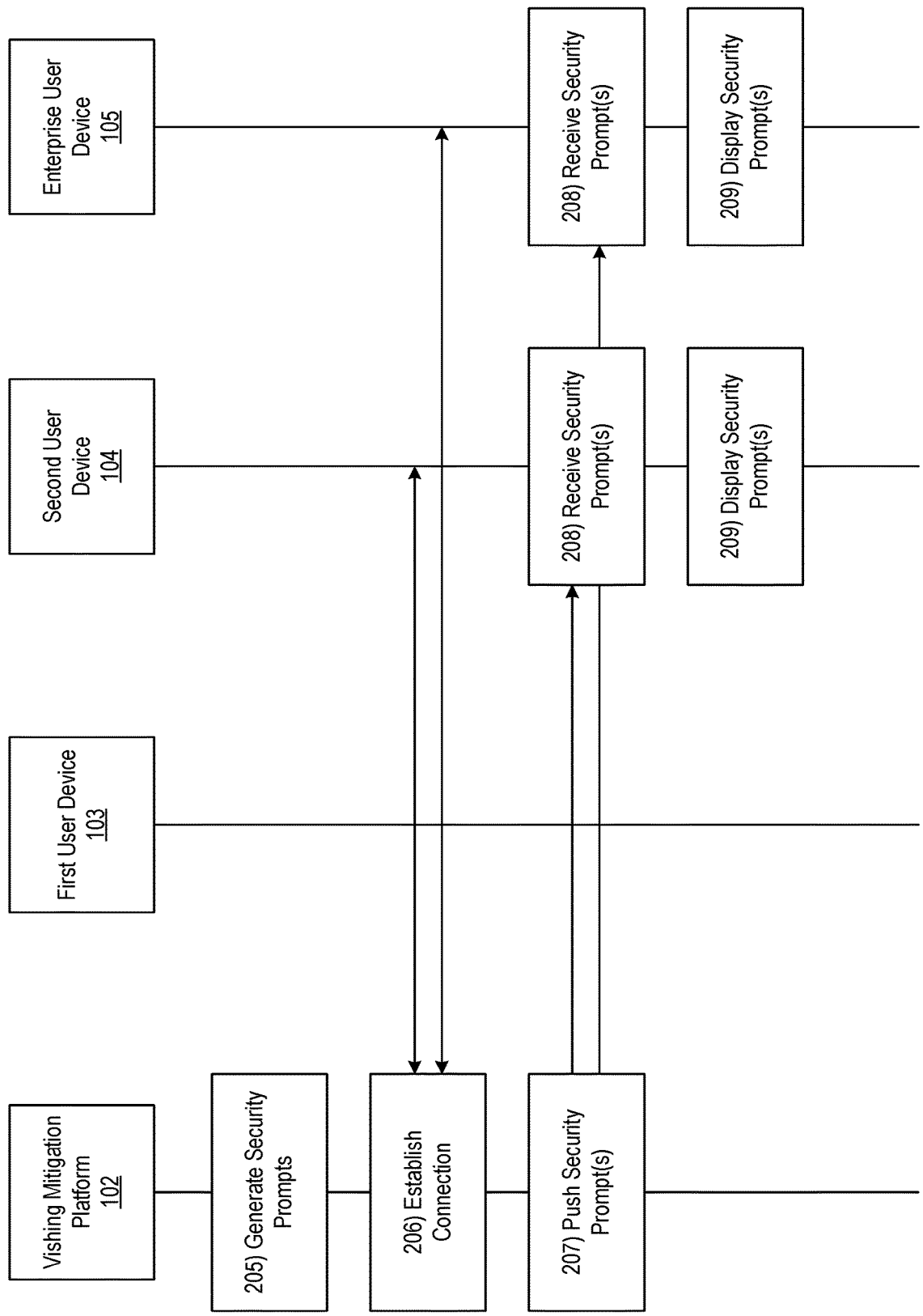

Referring to FIG. 2B, at step 205, vishing mitigation platform 102 may generate one or more security prompts. For example, the vishing mitigation platform 102 may input information of the call. For example, the vishing mitigation platform 102 may input call information (e.g., a topic being discussed), a caller identifier (e.g., representative of a user of the second user device 104), a recipient identifier (e.g., representative of a user of the first user device 104), and/or other information into the prompt generation model to generate corresponding security prompts. For example, the prompt generation model may output one or more security prompts. The prompt generation model may score the one or more security prompts based on the corresponding error rates associated with the given prompts (where a lower score indicates a higher error rate and a higher score indicates a lower error rate), and may select one or more security prompts with the highest scores (e.g., the prompts may be ranked based on scores, or the like). In some instances, the prompt generation model may generate the one or more security prompts based on identifying similar call conditions to historical call information (e.g., similar topics, similar participants, or the like) (e.g., at least a predetermined threshold amount of matching information), and may identify the corresponding prompts that were deployed in in the identified historical call. Using a similar technique, the prompt generation model may identify a number of security prompts to be generated.

In some instances, in generating the one or more security prompts, the vishing mitigation platform 102 may generate questions to be answered. In some instances, these questions may be based on information known only to (or accessible by) the user of the second user device 104. Additionally or alternatively, the vishing mitigation platform 102 may generate CAPTCHA prompts, which may be customized based on information known only to (or accessible by) the user of the second user device 104 (e.g., a particular date corresponding to the call initiator or recipient (or a combination thereof), a previous topic of conversation between the call participants, employee information (who is your manager, line of business, etc.), and/or other information). In some instances, the vishing mitigation platform 102 might not include, along with the CAPTCHA prompt, an indication of which elements should be selected (e.g., "select all images with a traffic light." or the like). Rather, a notification may be sent to a valid user on a separate channel (e.g., an email, SMS message, or the like) that indicates which elements should be selected. Additionally or alternatively, the CAPTCHA prompt may include an indication of which elements should be selected, but identification of the elements may be based on information known only to the user. For example, the prompt may indicate, "select all images that include a number corresponding to the month at which you started with the business," or the like. In some instances, the CAPTCHA prompt may include video and/or image elements. In some instances, the vishing mitigation platform 102 may generate the one or more security prompts based on information specific to the participants, historical conversations between the participants, or the like. In some instances, the one or more security prompts may prompt for an audio input, which may, e.g., be used to validate voiceprints, cadence, rate of speech, utterances, and/or other speech patterns for a legitimate enterprise user.

By dynamically creating and/or changing the security prompts in this way, the employee validation process may prevent bots from being trained on the prompts, thus enabling them to circumvent any imposed security measures. In some instances, the prompt generation model may generate the one or more security prompts using a tiered approach (e.g., a first prompt corresponding to the employee, a second prompt corresponding to the client, and a third prompt corresponding to a combination of employee/client information).

At step 206, the vishing mitigation platform 102 may establish connections with the second user device 104 and/or enterprise user device 105. For example, the vishing mitigation platform 102 may establish second and/or third wireless data connections with the second user device 104 and/or enterprise user device 105 to link the vishing mitigation platform 102 to the second user device 104 and/or enterprise user device 105 (e.g., in preparation for sending the one or more security prompts). In some instances, the vishing mitigation platform 102 may identify whether or not connections are already established with the second user device 104 and/or the enterprise user device 105. If connections are not yet established, the vishing mitigation platform 102 may establish the second and/or third wireless data connections accordingly. If connections are already established, the vishing mitigation platform 102 might not re-establish the connections.

At step 207, the vishing mitigation platform 102 may push the one or more security prompts to the second user device 104 and/or the enterprise user device 105. For example, the vishing mitigation platform 102 may push the one or more security prompts to the second user device 104 and/or the enterprise user device 105 via the communication interface 113 and while the second and/or third wireless data connections are established. In some instances, the vishing mitigation platform 102 may also send one or more commands directing the second user device 104 and/or enterprise user device 105 to display the one or more security prompts.

At step 208, the second user device 104 and/or enterprise user device 105 may receive the one or more security prompt(s) sent at step 207. For example, the second user device 104 and/or enterprise user device 105 may receive the one or more security prompt(s) while the second and/or third wireless data connections are established.

At step 209, based on or in response to the one or more commands directing the second user device 104 and/or the enterprise user device 105 to display the one or more security prompts, the second user device 104 and/or the enterprise user device 105 may display the one or more security prompts. For example, the second user device 104 and/or the enterprise user device 105 may display a graphical user interface similar to graphical user interface 405, which is illustrated in FIG. 4.

Figure 2C:
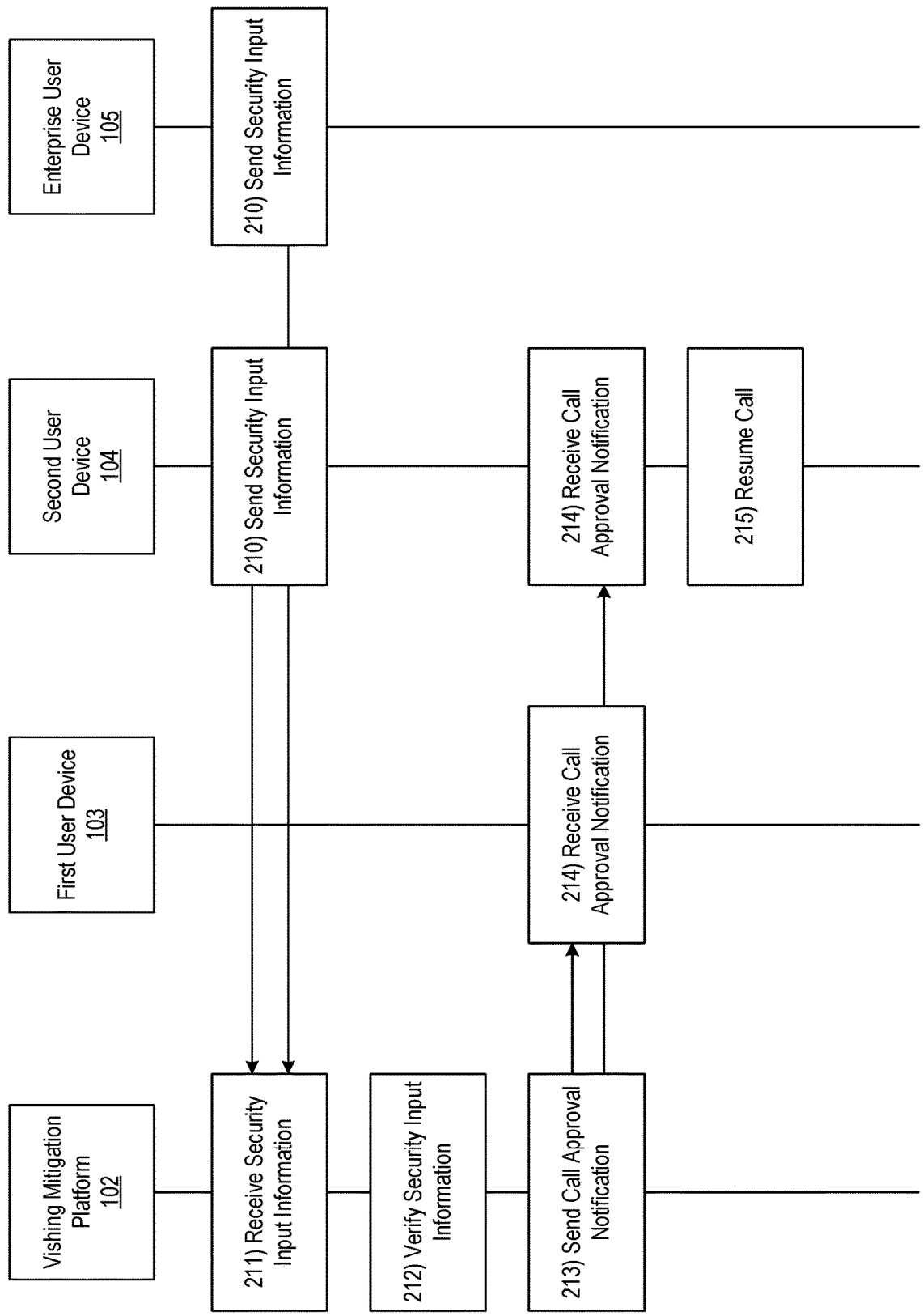

Referring to FIG. 2C, at step 210, the second user device 104 and/or enterprise user device 105 may receive security input information in response to the one or more security prompts (e.g., in response to the requested information). In some instances, the second user device 104 and/or enterprise user device 105 may provide a limited number of chances to input the correct security input information. The second user device 104 and/or enterprise user device 105 may send the security input information to the vishing mitigation platform 102. For example, the second user device 104 and/or enterprise user device 105 may send the security input information while the second and/or third wireless data connections are established.

At step 211, the vishing mitigation platform 102 may receive the security input information sent at step 210. For example, the vishing mitigation platform 102 may receive the security input information via the communication interface 113 and while the second and/or third wireless data connection is established. In some instances, the vishing mitigation platform 102 may continually loop back to step 207 until all security prompts have been sent at the corresponding security input information has been received.

At step 212, the vishing mitigation platform 102 may validate the security input information. For example, the vishing mitigation platform 102 may identify whether or not the security input information matches the anticipated security information. In some instances, the vishing mitigation platform 102 may identify whether or not all of the security input information is valid. In other instances, the vishing mitigation platform 102 may identify whether at least a threshold amount of the security input information is valid. In some instances, the vishing mitigation platform 102 may identify this threshold by inputting the call information, participant information, and/or other information into the prompt generation model (e.g., the threshold may be higher for transactions of higher value, such as a higher threshold for a first transaction with a first value, as compared to a lower threshold for a second transaction with a second value, where the second value is less than the first value). As another example, the threshold for a deposit transaction may be lower than the threshold for a withdrawal transaction, or the like.

In instances where the vishing mitigation platform 102 identifies that the security input information (or at least a threshold amount of the security input information) is valid, the vishing mitigation platform 102 may proceed to step 213. Otherwise, if the vishing mitigation platform 102 identifies that the security input information (or at least the threshold amount of the security input information) is not valid, the vishing mitigation platform 102 may proceed to step 216.

At step 213, the vishing mitigation platform 102 may send a call approval notification to the second user device 104. For example, the vishing mitigation platform 102 may send a call approval notification to the first user device 103 and/or second user device 104 via the communication interface 113 and while the second wireless data connection is established. In some instances, the vishing mitigation platform 102 may also send one or more commands directing the second user device 104 to display the call approval notification.

At step 214, the first user device 103 and/or the second user device 104 may receive the call approval notification sent at step 213. For example, the first user device 103 and/or the second user device 104 may receive the call approval notification while the first and/or second wireless data connection is established. In some instances, the first user device 103 and/or second user device 104 may also receive the one or more commands directing the second user device 104 to display the call approval notification.

At step 215, the first user device 103 and/or second device 104 may cause the call to resume. In some instances, based on the one or more commands directing the second user device 104 to display the call approval notification, the second user device 104 may display the call approval notification. For example, the first user device 103 and/or second user device 104 may display a graphical user interface similar to graphical user interface 605, which is illustrated in FIG. 6. The event sequence may then proceed to step 217, where the prompt generation model may be updated, as is described below.

Figure 2D:
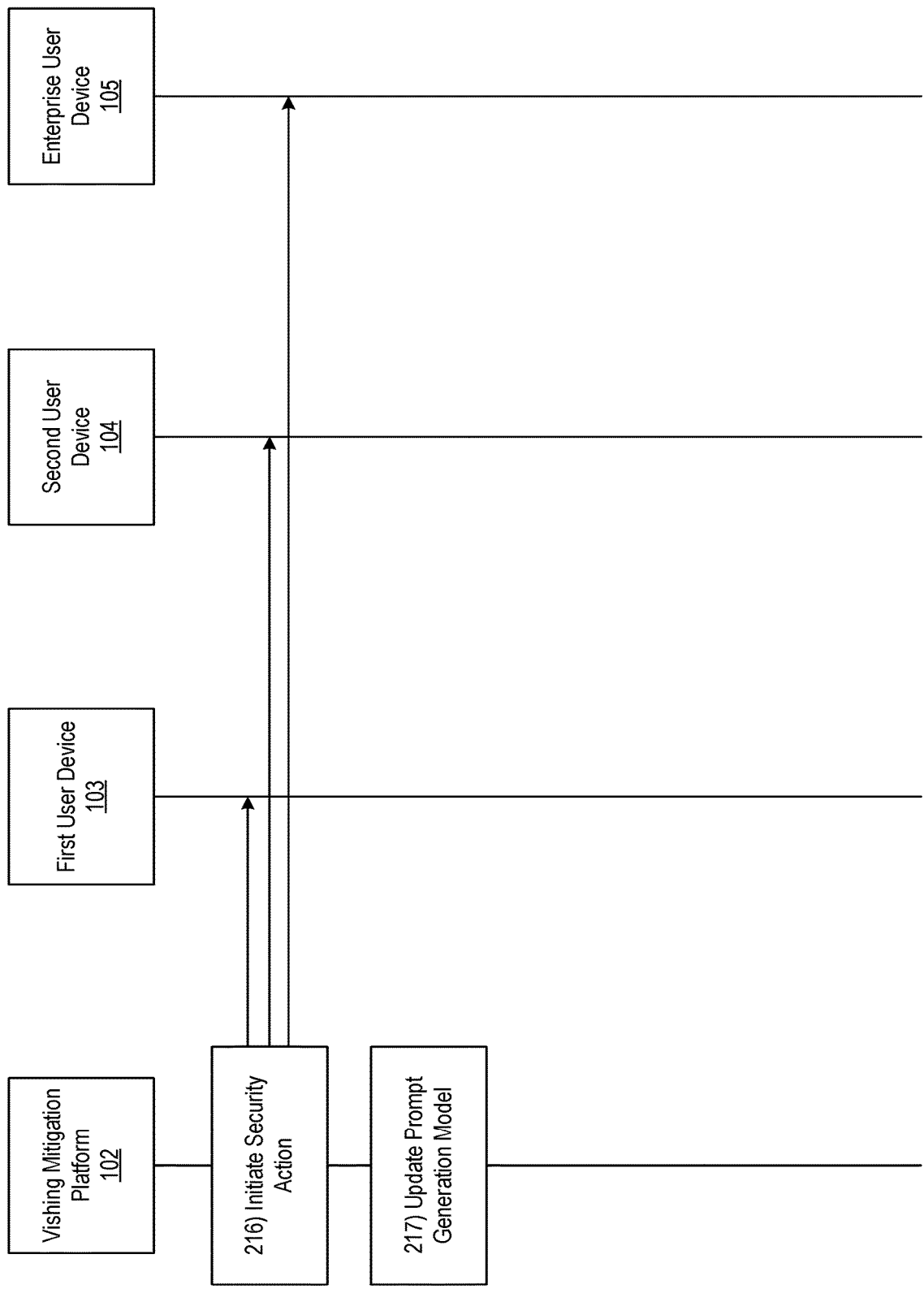

Returning to step 212, if the vishing mitigation platform 102 identified that the security input information is not valid, it may have proceeded to step 216, as is depicted in FIG. 2D. Referring to FIG. 2D, at step 216, the vishing mitigation platform 102 may identify that the call was initiated using a deepfake, chatbot, and/or other impersonation technique, may initiate one or more security actions. For example, the vishing mitigation platform 102 may send a notification to the enterprise user device 105 (which may, e.g., correspond to an employee being impersonated via the second user device 104), and which may notify the enterprise user device 105 of the detected vishing attempt. In these instances, the vishing mitigation platform 102 may send one or more commands directing the enterprise user device 105 to display the security notification, which may, e.g., cause the enterprise user device 105 to display the security notification. Additionally or alternatively, the vishing mitigation platform 102 may send a recording of the call to an administrator for further analysis.

Additionally or alternatively, the vishing mitigation platform 102 may communicate with the first user device 103 and/or second user device 104 to terminate the call. Additionally or alternatively, the vishing mitigation platform 102 may send a security notification to the first user device 103, which may inform the first user device 103 of the detected vishing threat, and prompting a corresponding user to terminate the call. For example, the vishing mitigation platform 102 may send a notification similar to graphical user interface 705, which is illustrated in FIG. 7.

At step 217, the vishing mitigation platform 102 may update the prompt generation model based on the one or more security prompts, the security input information, results of the validation, information of the call participants, information of the call, user feedback on the validation, and/or other information. In doing so, the vishing mitigation platform 102 may continue to refine the prompt generation model using a dynamic feedback loop, which may, e.g., increase the accuracy and effectiveness of the model in detecting and mitigating vishing attacks.

For example, the vishing mitigation platform 102 may use the one or more security prompts, the security input information, results of the validation, information of the call participants, information of the call, user feedback on the validation, and/or other information to reinforce, modify, and/or otherwise update the prompt generation model, thus causing the model to continuously improve (e.g., in terms of performing prompt generation for vishing detection/mitigation).

For example, in some instances, the vishing mitigation platform 102 may update the prompt generation model to include new security prompts, remove existing security prompts, and/or otherwise modify the available prompts for selection based on receiving consensus feedback information indicating that the one or more security prompts resulted in one of a false positive validation or a false negative validation. In doing so, the vishing mitigation platform 102 may minimize an error rate corresponding to generated prompts.

In some instances, the vishing mitigation platform 102 may continuously refine the prompt generation model. In some instances, the vishing mitigation platform 102 may maintain an accuracy threshold for the prompt generation model, and may pause refinement (through the dynamic feedback loops) of the model if the corresponding accuracy is identified as greater than the corresponding accuracy threshold. Similarly, if the accuracy fails to be equal or less than the given accuracy threshold, the vishing mitigation platform 102 may resume refinement of the model through the corresponding dynamic feedback loop.

In doing so, subsequent communications may be analyzed by the prompt generation model based on the configuration information identified above, and thus prompt generation for automated detection/mitigation of vishing attacks may continuously improve. By operating in this way, the vishing mitigation platform 102 may automatically detect and mitigate vishing attacks, thus maintaining information security.

Figure 3:
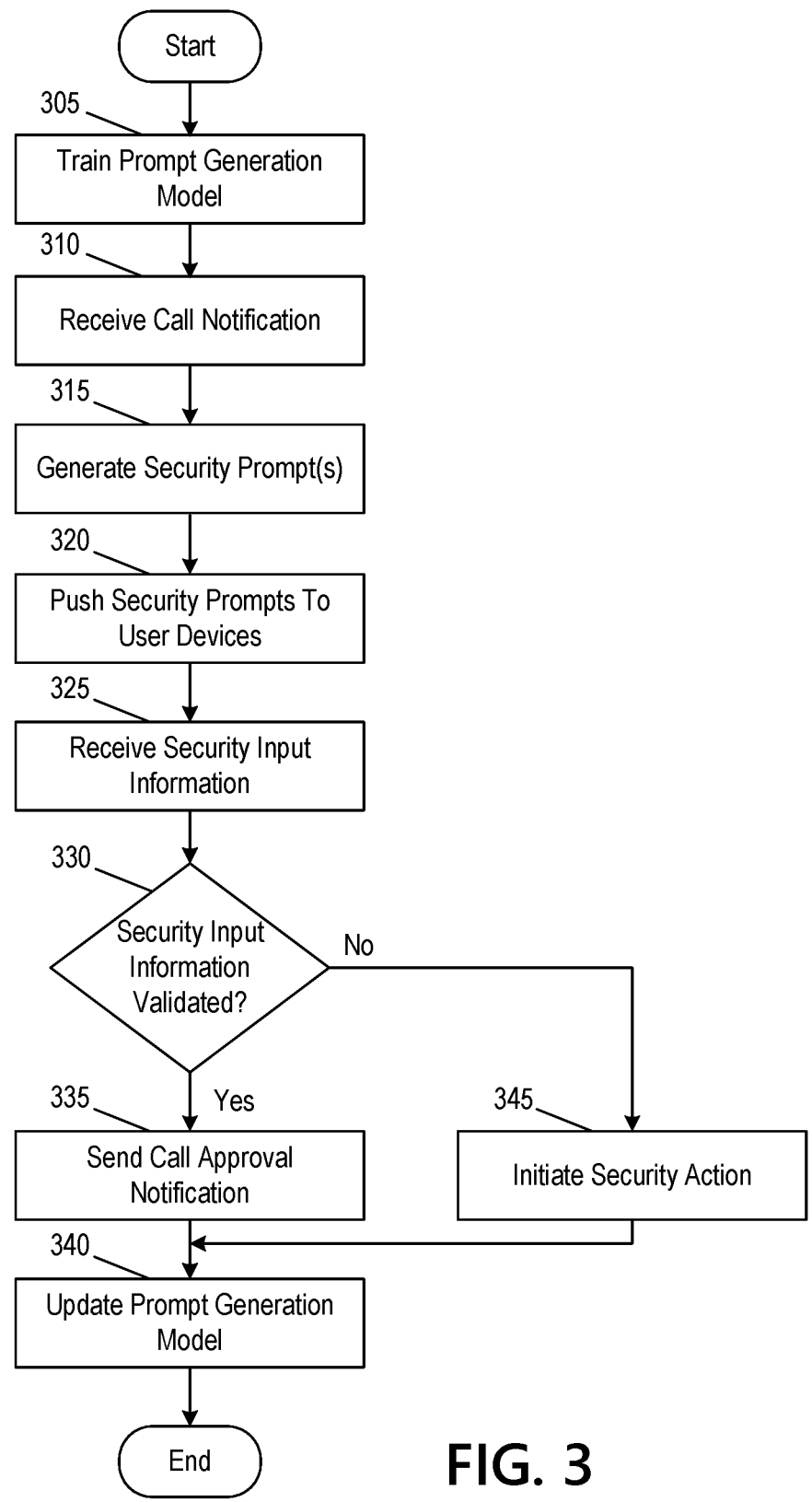
FIG. 3 depicts an illustrative method for preventing deepfake and chatbot attacks using automated vishing detection in accordance with one or more example embodiments.

FIG. 3 depicts an illustrative method for preventing deepfake and chatbot attacks using automated vishing detection in accordance with one or more example embodiments. At step 305, a computing platform having at least one processor, a communication interface, and memory may train a prompt generation model. At step 310, the computing platform may receive a call notification, indicating a call between two individuals. At step 315, the computing platform may generate, using the prompt generation model, one or more security prompts, configured to prompt an initiator of the call for security input information (which may, e.g., be used to validate an identity of the initiator). At step 320, the computing platform may push the one or more security prompts to the user devices. At step 325, the computing platform may receive security input information from the initiator's user device. At step 330, the computing platform may attempt to validate the security input information. If the security input information is validated, the computing platform may proceed to step 335.

At step 335, the computing platform may send a call approval notification to the user devices of the two individuals, which may cause the call to resume. At step 340, the computing platform may update the prompt generation model.

Returning to step 330, if the security input information is not validated, the computing platform may proceed to step 345. At step 345, the computing platform may initiate a security action for the call. The computing platform may then proceed to step 340 to update the prompt generation model as described above.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, using historical call information, a prompt generation model, wherein training the prompt generation model configures the prompt generation model to identify, for an initiated call between a first individual and a second individual, one or more security prompts to validate an identity of the first individual;

detect a first call between the first individual and the second individual, wherein the first call was initiated by the first individual;

temporarily pause the first call;

input, into the prompt generation model and while the first call is paused, information of one or more of: the first call, the first individual, or the second individual, wherein inputting the information causes the prompt generation model to output the one or more security prompts, wherein the one or more security prompts comprise customized CAPTCHA tests based on the information;

send, while the first call is paused and to a user device of the first individual, the one or more security prompts and one or more commands directing the user device to display the one or more security prompts, wherein sending the one or more commands directing the user device to display the one or more security prompts causes the user device to display the one or more security prompts;

receive, while the first call is paused and from the user device, security input information comprising responses to the one or more security prompts;

validate, while the first call is paused, the security input information; and based on successful validation of the security input information, cause the first call to resume.

2. The computing platform of claim 1, wherein the historical call information comprises one or more of: call topic information, caller information, recipient information, or geolocation information.

3. The computing platform of claim 1, wherein the one or more security prompts further comprise one or more personalized questions for the first individual.

4. The computing platform of claim 1, wherein the customized CAPTCHA tests prompt the first individual to select one or more images, from a plurality of images, wherein the one or more images include information specific to one or more of: the first individual, the second individual, or a combination of the first individual and the second individual.

5. The computing platform of claim 4, wherein an indication of a type of information to be selected from the one or more images is sent to the first individual using a different channel than is used to send the one or more images, and at a different time than the one or more images are sent.

6. The computing platform of claim 4, wherein the customized CAPTCHA tests do not indicate which of the plurality of images should be selected.

7. The computing platform of claim 1, wherein the customized CAPTCHA tests prompt the first individual to select one or more images that include numeric information corresponding to a profile of the first individual, a profile of the second individual, and a historical interaction between the first individual and the second individual.

8. The computing platform of claim 1, wherein validating the security input information comprises comparing a number of correct responses to the one or more security prompts to a security threshold, wherein the security threshold is selected based on the information of the second individual and the information of the first call.

9. The computing platform of claim 1, wherein the memory stores additional computer-readable instructions that, when executed by the at least one processor, further cause the computing platform to:

based on failing to successfully validate the security input information:
identify that the first individual corresponds to one of: a deepfake, a chatbot, or an impersonator,
terminate the first call, and
initiate one or more security actions.

10. The computing platform of claim 1, wherein the memory stores additional computer-readable instructions that, when executed by the at least one processor, further cause the computing platform to:

update, using a dynamic feedback loop and based on the one or more security prompts, the security input information, the information of the first individual, the information of the second individual, and the information of the first call, the prompt generation model.

11. The computing platform of claim 1, wherein updating the prompt generation model causes the prompt generation model to perform one or more of: adding new security prompts or removing the one or more security prompts based on receiving consensus information from a plurality of individuals indicating that the one or more security prompts resulted in one of: a false positive validation or a false negative validation.

12. The computing platform of claim 1, wherein pausing the first call is based on detecting, using natural language processing and by an application running on a user device of a second user, that the first call corresponds to a conversation regarding confidential information.

13. A method comprising:
at a computing platform comprising at least one processor, a communication interface, and memory:
training, using historical call information, a prompt generation model, wherein training the prompt generation model configures the prompt generation model to identify, for an initiated call between a first individual and a second individual, one or more security prompts to validate an identity of the first individual;

detecting a first call between the first individual and the second individual, wherein the first call was initiated by the first individual;

temporarily pausing the first call;

inputting, into the prompt generation model and while the first call is paused, information of one or more of: the first call, the first individual, or the second individual, wherein inputting the information causes the prompt generation model to output the one or more security prompts, wherein the one or more security prompts comprise customized CAPTCHA tests based on the information;

sending, while the first call is paused and to a user device of the first individual, the one or more security prompts and one or more commands directing the user device to display the one or more security prompts, wherein sending the one or more commands directing the user device to display the one or more security prompts causes the user device to display the one or more security prompts;

receiving, while the first call is paused and from the user device, security input information comprising responses to the one or more security prompts;

validating, while the first call is paused, the security input information; and based on successful validation of the security input information, causing the first call to resume.

14. The method of claim 13, wherein the historical call information comprises one or more of: call topic information, caller information, recipient information, or geolocation information.

15. The method of claim 13, wherein the one or more security prompts further comprise one or more personalized questions for the first individual.

16. The method of claim 13, wherein the customized CAPTCHA tests prompt the first individual to select one or more images, from a plurality of images, wherein the one or more images include information specific to one or more of: the first individual, the second individual, or a combination of the first individual and the second individual.

17. The method of claim 16, wherein an indication of a type of information to be selected from the one or more images is sent to the first individual using a different channel than is used to send the one or more images, and at a different time than the one or more images are sent.

18. The method of claim 16, wherein the customized CAPTCHA tests do indicate which of the plurality of images should be selected.

19. The method of claim 13, wherein the customized CAPTCHA tests prompt the first individual to select one or more images that include numeric information corresponding to a profile of the first individual, a profile of the second individual, and a historical interaction between the first individual and the second individual.

20. One or more non-transitory computer-readable media storing instructions that, when executed by a computing platform comprising at least one processor, a communication interface, and memory, cause the computing platform to:

train, using historical call information, a prompt generation model, wherein training the prompt generation model configures the prompt generation model to identify, for an initiated call between a first individual and a second individual, one or more security prompts to validate an identity of the first individual;

detect a first call between the first individual and the second individual, wherein the first call was initiated by the first individual;

temporarily pause the first call;

input, into the prompt generation model and while the first call is paused, information of one or more of: the first call, the first individual, or the second individual, wherein inputting the information causes the prompt generation model to output the one or more security prompts, wherein the one or more security prompts comprise customized CAPTCHA tests based on the information;

send, while the first call is paused and to a user device of the first individual, the one or more security prompts and one or more commands directing the user device to display the one or more security prompts, wherein sending the one or more commands directing the user device to display the one or more security prompts causes the user device to display the one or more security prompts;

receive, while the first call is paused and from the user device, security input information comprising responses to the one or more security prompts;

validate, while the first call is paused, the security input information; and based on successful validation of the security input information, cause the first call to resume.

\* \* \* \* \*